US009130716B2

(12) United States Patent
Guey et al.

(10) Patent No.: US 9,130,716 B2
(45) Date of Patent: *Sep. 8, 2015

(54) REFERENCE SYMBOL DISTRIBUTION METHOD AND APPARATUS

(71) Applicant: TELEFONAKTIEBOLAGET L M ERICSSON (PUBL), Stockholm (SE)

(72) Inventors: Jiann-Ching Guey, Hsinchu (TW); Havish Koorapaty, Saratoga, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 3 days.

This patent is subject to a terminal disclaimer.

(21) Appl. No.: 14/136,060

(22) Filed: Dec. 20, 2013

(65) Prior Publication Data

US 2014/0105173 A1    Apr. 17, 2014

Related U.S. Application Data

(63) Continuation of application No. 12/466,868, filed on May 15, 2009, now Pat. No. 8,638,745.

(51) Int. Cl.
*H04W 72/04* (2009.01)
*H04L 5/00* (2006.01)
*H04L 5/02* (2006.01)

(52) U.S. Cl.
CPC ............. *H04L 5/0048* (2013.01); *H04L 5/02* (2013.01); *H04W 72/04* (2013.01)

(58) Field of Classification Search
None
See application file for complete search history.

(56) References Cited

U.S. PATENT DOCUMENTS

| 7,342,974 | B2 * | 3/2008 | Chiou ........................... 375/260 |
| 7,929,636 | B2 | 4/2011 | Kotecha |
| 8,040,969 | B2 | 10/2011 | Mazet et al. |
| 8,150,399 | B2 * | 4/2012 | Wong et al. ................... 455/443 |
| 2006/0013338 | A1 * | 1/2006 | Gore et al. ..................... 375/324 |
| 2008/0225965 | A1 | 9/2008 | Pi et al. |
| 2009/0080547 | A1 * | 3/2009 | Naka et al. .................... 375/260 |

(Continued)

FOREIGN PATENT DOCUMENTS

EP    2 031 790 A1    3/2009

OTHER PUBLICATIONS

Li, S., et al., "Common and Dedicated Pilots in a Resource Block for MIMO Systems", IEEE 802.16 Broadband Wireless Access Working Group, Mar. 10, 2008, Piscataway, NJ, USA, the whole document.

*Primary Examiner* — Anh-Vu Ly
*Assistant Examiner* — Robert A Shand (57) ABSTRACT

At least some reference symbols dedicated to a particular communication device are transmitted in resource blocks allocated to other devices. This way, reference symbol assignments are not unduly restricted by other constraints placed on the boundary elements of a resource block. According to an embodiment, data and reference signals are transmitted by transmitting a resource block allocated to a first communication device. The resource block includes a plurality of resource elements, each resource element corresponding to a modulation symbol. At least one reference symbol associated with the resource block and dedicated to the first communication device is transmitted in a resource block allocated to a second communication device. On the receive side, the communication device can perform channel estimation based on reference symbols dedicated to the device that are transmitted in resource blocks allocated to the device and in resource block(s) allocated to other communication device(s).

24 Claims, 8 Drawing Sheets

(56) References Cited

U.S. PATENT DOCUMENTS

2009/0285173 A1    11/2009    Koorapaty et al.
2010/0254341 A1*    10/2010    Sun et al. .................. 370/330
2011/0092231 A1*    4/2011    Yoo et al. .................. 455/501

* cited by examiner

REFERENCE SYMBOL DISTRIBUTION METHOD AND APPARATUS

CROSS-REFERENCE TO RELATED APPLICATION

This application is a continuation of U.S. patent application Ser. No. 12/466,868, filed on May 15, 2009, now U.S. Pat. No. 8,638,745, issued Jan. 28, 2014, which is incorporated by reference herein in its entirety.

TECHNICAL FIELD

The present invention generally relates to reference symbol distribution, and more particularly relates distributing reference symbols dedicated to particular communication devices outside the resource blocks allocated to those communication devices.

BACKGROUND

In a wireless packet-switched data network employing Orthogonal Frequency Division Multiplexing (OFDM), modulated symbols are constructed from a data packet and inserted into a resource block enclosed by a rectangular area in the time-frequency domain. The resource block is allocated to the user of the data packet and transmitted to the user over the air. The resource block includes consecutive sub-carriers in the frequency domain and consecutive OFDM symbols in the time domain. For example, in LTE (long-term evolution), a resource block includes 12 consecutive sub-carriers in the frequency domain and 14 consecutive OFDM symbols in the time domain (7 symbols per slot). Each element of the resource block represents a basic unit in which a complex-valued symbol can be transmitted.

The user must estimate the channel over which the resource block is transmitted in order to coherently demodulate the symbols included in the resource block. Known reference symbols, commonly referred to as pilot symbols, are also transmitted in the resource block to enable channel estimation at the user. The known reference symbols are dedicated to the user for certain transmission modes meaning only that user can process the reference symbols. When dedicated reference symbols are used, the same transmission methods used for the data symbols are also used for the known reference symbols. For example, when precoding is used with multiple transmit antennas in combination with dedicated reference symbols, the precoding applied to the data symbols is also applied to the known reference symbols. Various cases that use dedicated reference symbols for a particular user include scenarios where pre-coding or beam directing and/or beam forming is used in MIMO (multiple-input multiple-output) systems. The user allocated the resource block uses the reference symbols included in the resource block to estimate the response of the channel and demodulates the data symbols included in the resource block based on the channel estimate.

The response of the wireless channel in an OFDM system is a slow-varying, two-dimensional function of time and frequency. To accurately estimate this function, the density and placement of the known reference symbols must be properly designed. In conventional OFDM systems, a resource block is a self-contained unit where both data and reference symbols are confined to the same resource block. The resource block is dedicated to the user for which the data packet is intended. As such, a user conventionally processes symbols extracted only from resource blocks allocated to that user, including reference symbols for channel estimation.

Better channel estimation performance can be achieved when the reference symbols are placed along the boundary (e.g., at the corners) of the resource block. This way, the entire part of the channel response can be interpolated from the observations at the boundary reference symbol locations instead of being extrapolated from only observations at interior reference symbol locations. However, many practical considerations limit the amount of reference symbol boundary allocations that can be made within a particular resource block. For example, reference signal sequences are commonly used to carry device identities such as cell identities. Restricting the reference symbols to border locations along or near the periphery of the resource block can severely limit the number of unique patterns available to identify multiple devices. In addition, MIMO advanced antenna systems employ spatial multiplexing so that different streams of data can be transmitted using the same resource block. However, the corner locations of the resource block can only be assigned to one of the antennas. Otherwise, severe interference can occur. The remaining antennas thus experience performance loss because the channel response is estimated by extrapolation from observations at interior reference symbol locations instead of interpolation from border observations.

SUMMARY

According to the methods and apparatus disclosed herein, not all reference symbols dedicated to a particular communication device are transmitted in resource blocks allocated to that communication device. Instead, at least some of the reference symbols are transmitted in resource blocks allocated to other devices. This way, reference symbol assignments are not unduly restricted by other constraints placed on the boundary elements of a resource block. As a result, part of a conventional resource block may be occupied by reference symbols associated with a data packet carried in a different resource block and intended for a different communication device. At least some of the communication device's reference symbols can be distributed outside the device's resource block in a way that still encompasses the block, e.g., in the time-frequency domain for OFDM systems. This way, channel conditions can be estimated by interpolation without having to use the boundary elements of the resource block for reference symbol assignments. Some of the data symbols dedicated to the communication device can also be transmitted in resource blocks allocated to other communication devices.

According to an embodiment, data and reference signals are transmitted by transmitting a resource block allocated to a first communication device. The resource block includes a plurality of resource elements, each resource element corresponding to a modulation symbol. A reference symbol associated with the resource block and dedicated to the first communication device is transmitted in a resource block allocated to a second communication device. On the receive side, the communication device can perform channel estimation based on reference symbols dedicated to the device that are transmitted in resource blocks allocated to the device and in resource block(s) allocated to other communication device(s).

Of course, the present invention is not limited to the above features and advantages. Those skilled in the art will recognize additional features and advantages upon reading the following detailed description, and upon viewing the accompanying drawings.

DETAILED DESCRIPTION

Figure 1:
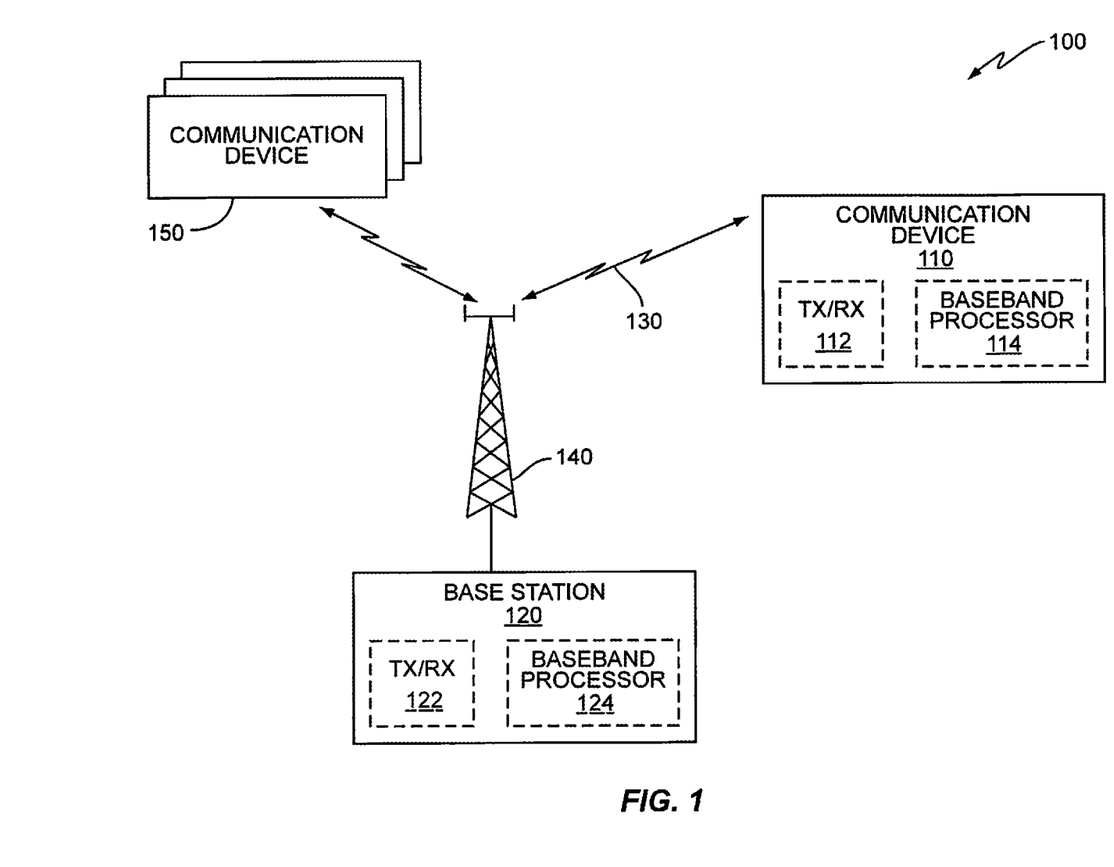
FIG. 1 illustrates a block diagram of an embodiment of a wireless communication network including a base station and communication devices.

FIG. 1 illustrates an embodiment of a wireless communication network 100 including a communication device 110 such as a mobile phone, portable computer, etc. in communicative contact with a base station 120. Data can be exchanged both downstream (base station-to-device) and upstream (device-to-base station) over a communication channel 130 established between the base station 120 and the communication device 110. The base station 120 periodically transmits known reference symbols, also referred to as pilot symbols, to the communication device 110 so that the device 110 can estimate conditions of the channel 130. The channel estimate is used by the communication device 110 to coherently demodulate data symbols received from the base station 120.

Data symbols transmitted to the communication device 110 are constructed from a data packet and inserted into one or more resource blocks allocated to the device 110. In one embodiment, the wireless communication network 100 is a packet-switched data network employing OFDM. According to this embodiment, the modulated symbols are inserted into one or more resource blocks enclosed by a generally rectangular area in the time-frequency domain. In another embodiment, the wireless network 100 is a WiMAX (worldwide interoperability for microwave access) network which uses SOFDMA (scalable orthogonal frequency-division multiple access) as the underlying access technology. In still another embodiment, the wireless network 100 may be an EDGE network that employs TDMA (time division multiple access) as the underlying access technology. Still other types of access technologies may be used by the wireless network 100 such as MIMO, CDMA (code division multiple access), HC-SDMA (high capacity spatial division multiple access), etc. For ease of illustration and explanation only, embodiments are described next in more detail based on the OFDM access technology unless expressly stated otherwise. However, one of average skill in the art can readily extend the embodiments described herein to any access technology that allocates wireless resources as resource blocks in time, frequency and/or space, and thus the following embodiments and description should be considered exemplary and non-limiting.

In more detail, the base station 120 is coupled to an antenna system 140 and includes transmit and receive circuitry 122 and a baseband processor 124. The communication device 110 similarly includes transmit and receive 112 circuitry and a baseband processor 114. When a data packet is ready for transmission to the communication device 110, the base station baseband processor 124 allocates one or more resource blocks to the device 110, e.g., as illustrated by Step 200 of FIG. 2. Each resource block includes a number of consecutive sub-carriers in the frequency domain and a number of consecutive OFDM symbols in the time domain. Each element of the resource block represents a basic unit in which a complex-valued symbol can be transmitted. The base station baseband processor 124 constructs modulated symbols from the data packet and inserts the symbols into the resource block(s) for transmission to the communication device 110.

Figure 2:
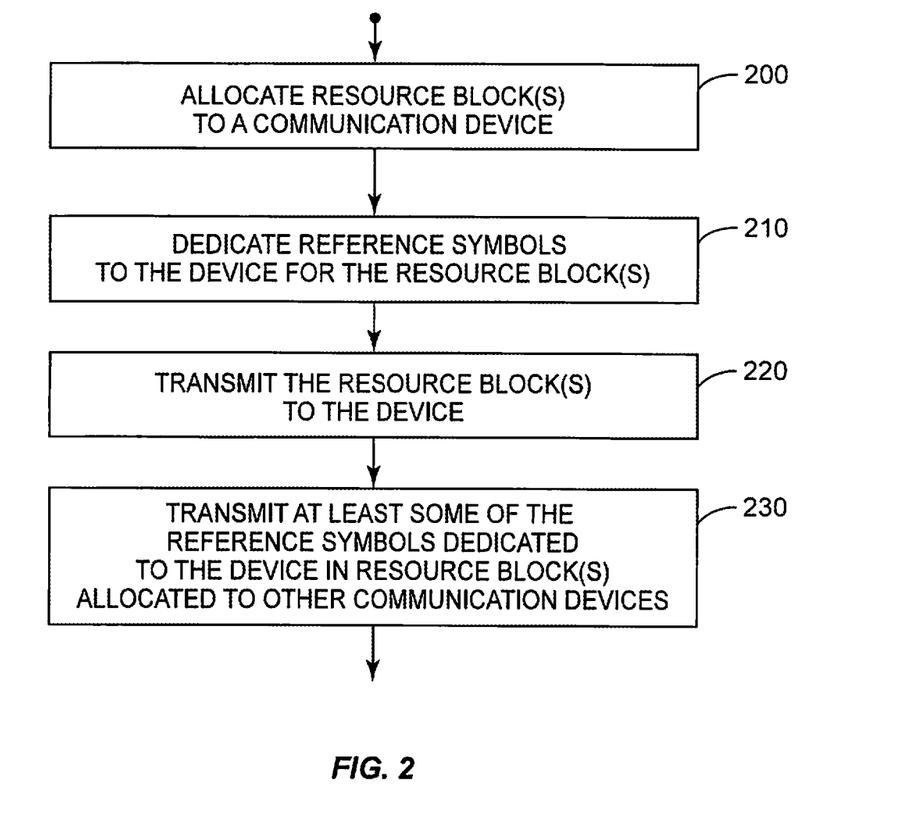
FIG. 2 illustrates an embodiment of a method for distributing dedicated reference symbols in a wireless communication network.

The base station baseband processor 124 also dedicates several known reference symbols to the communication device 110 that are associated with the resource block(s), e.g., as illustrated by Step 210 of FIG. 2. The communication device 110 uses the reference symbols to estimate channel conditions. The reference symbols are dedicated to the communication device 110 meaning that only that device 110 can process the reference symbols, i.e. the reference symbols are not common or shared pilot symbols. Various techniques are known for dedicating reference symbols to a particular communication device such as pre-coding or beam directing and/or beam forming for MIMO systems. Each resource block is then transmitted to the communication device 110 over the channel 130, e.g., as illustrated by Step 220 of FIG. 2. The reference symbols associated with each resource block are also transmitted to the device 110. However, not all of the reference symbols associated with a particular resource block are transmitted within that block. Instead, one or more of the reference symbols are transmitted in resource block(s) allocated to other communication devices 150, e.g., as illustrated by Step 230 of FIG. 2. This way, fewer restrictions are placed on reference symbol distributions.

Figure 3:
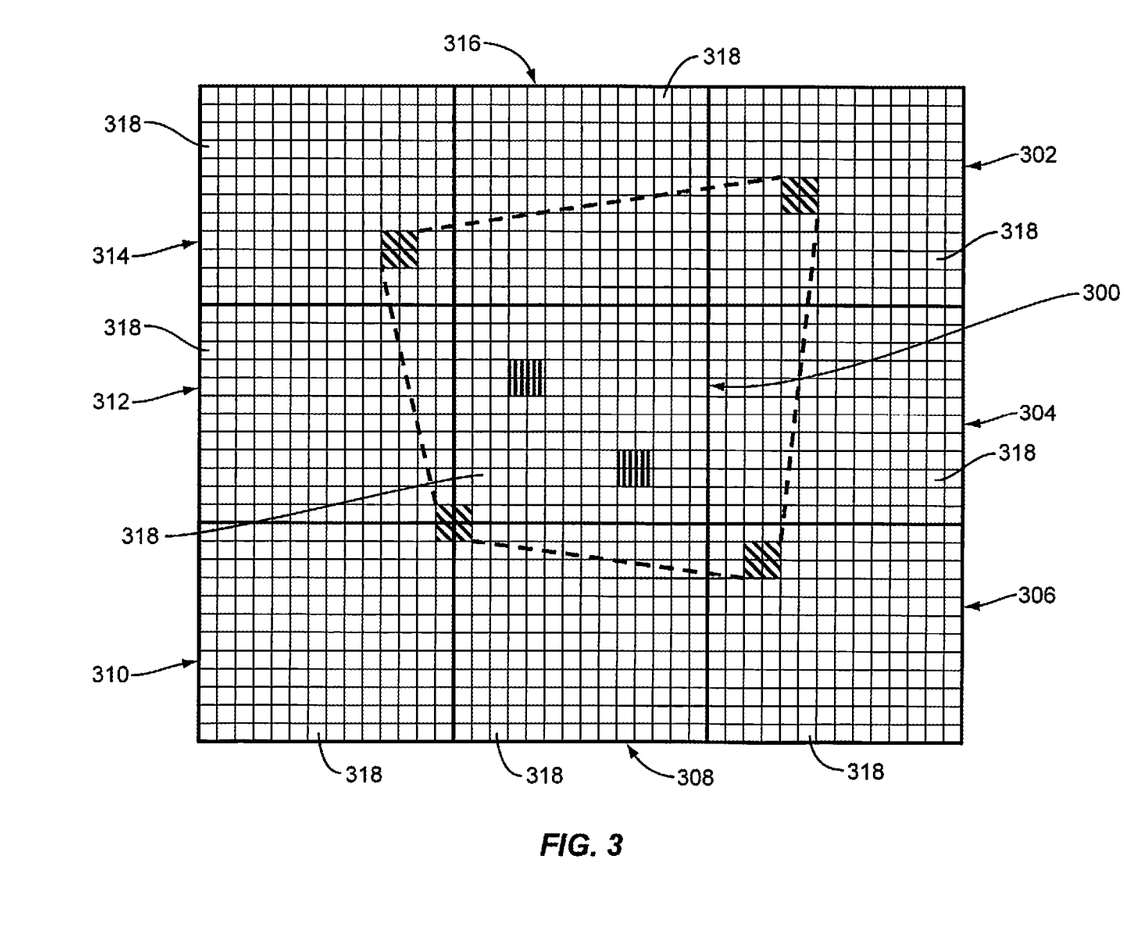
FIG. 3 illustrates a block diagram of an embodiment of an OFDM reference symbol distribution scheme.

FIG. 3 illustrates an embodiment of an OFDM resource block 300 allocated to a communication device 110 where at least some of the reference symbols associated with the resource block 300 are transmitted in one or more resource blocks 302-316 allocated to other communication devices 150 as indicated by the resource elements 318 having the diagonal stripes. According to this exemplary embodiment, the centermost OFDM resource block 300 is allocated to a particular communication device 110 and has 12 consecutive sub-carriers and 14 consecutive OFDM symbols. The surrounding resource blocks 302-316 are allocated to other communication devices 150. The base station baseband processor 124 associates several reference symbols with the centermost resource block 300 for use by the communication device 110 in estimating channel conditions. At least some of these reference symbols are transmitted outside the centermost resource block 300 in at least some of the surrounding resource blocks 302-316. As shown in FIG. 3, four reference symbols are transmitted in each of the upper-right, lower-right and upper-left resource blocks 302, 306, 314. The center-bottom, lower-left and center-left resource blocks 308, 310, 312 each include one of the reference symbols associated with the centermost resource block 300.

The resource elements 318 of the centermost resource block 300 also include reference symbols as well as data symbols. Some of the reference and/or data symbols included in the centermost resource block 300 may be dedicated to the user 110 of the block 300. Other reference and/or data symbols of included in the centermost resource block 300 may be dedicated to other communication devices 150 as indicated by the resource elements 318 having vertical stripes. Accordingly, fewer restrictions are placed on the distribution and transmission of reference and/or data symbols. Distributing reference symbols this way at least partly frees the boundary elements 318 of the resource blocks 300-316 for uses other than reference symbol transmission. As shown in FIG. 3, reference symbols can be mostly or entirely transmitted using the non-boundary elements 318 of the resource blocks 302-316. Yet, each resource block 302-316 can still be encompassed by related reference symbols so that channel estimates can be derived by interpolation rather than extrapolation. For example, FIG. 3 shows the centermost resource block 300 being encompassed in the time-frequency domain by reference signals dedicated to the communication device 110 for which the resource block 300 is allocated as indicated by the dashed lines in FIG. 3. The channel 130 over which the resource block 300 is transmitted falls within the portion of the time-frequency domain enclosed by the reference symbols. Thus, the receiving communication device 110 can estimate the channel conditions by interpolation rather than extrapolation using the dedicated reference symbols transmitted outside the resource block 300.

Figure 4:
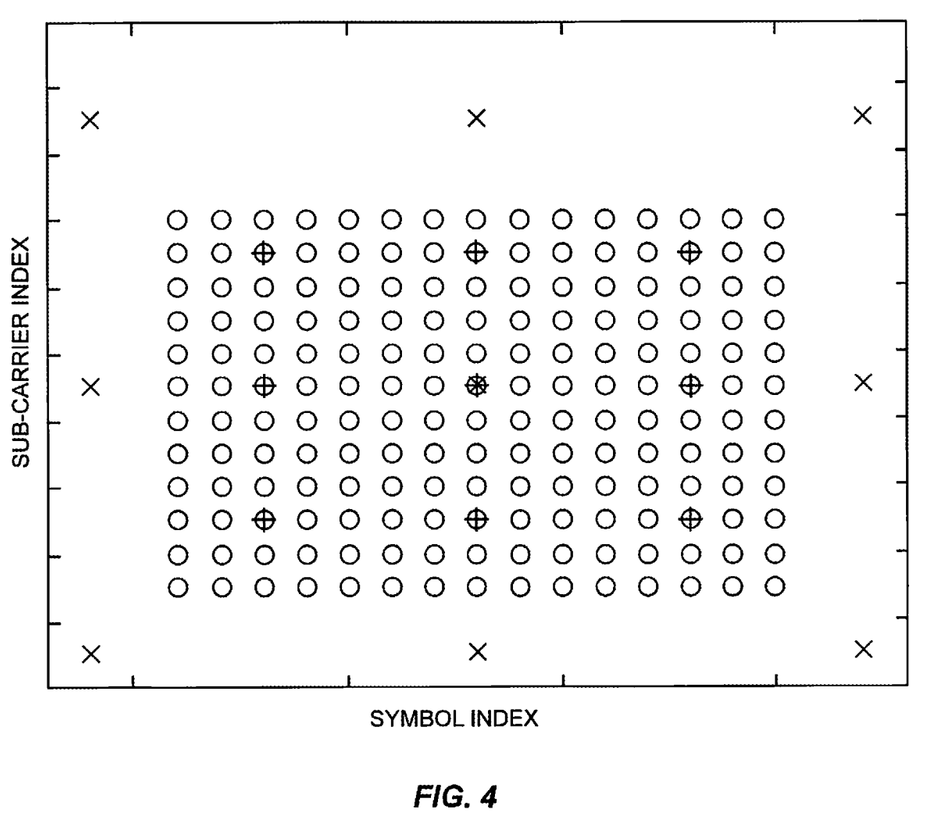
FIG. 4 compares the OFDM reference symbol distribution scheme of FIG. 3 to a typical conventional OFDM reference symbol distribution scheme.

FIG. 4 compares the OFDM reference symbol distribution embodiments disclosed herein to a typical conventional reference symbol distribution scheme. The exemplary resource block shown in FIG. 4 has 12 consecutive sub-carriers and 14 consecutive OFDM symbols. According to conventional reference symbol distribution schemes, all reference symbols associated with the resource block and dedicated to the user of the block are transmitted in the block as indicated by the resource elements marked with an '+'. According to the embodiments disclosed herein, at least some of the dedicated reference symbols associated with the resource block are transmitted in resource block(s) allocated to other device(s) as indicated by the 'X' markings. Unlike conventional approaches, channel estimates can be generated by interpolation rather than extrapolation even though reference symbols are transmitted in non-boundary resource elements according to the reference symbol distribution embodiments described herein. In addition, data symbol density can be increased when contiguous resource blocks are allocated to the same communication device.

Figure 5:
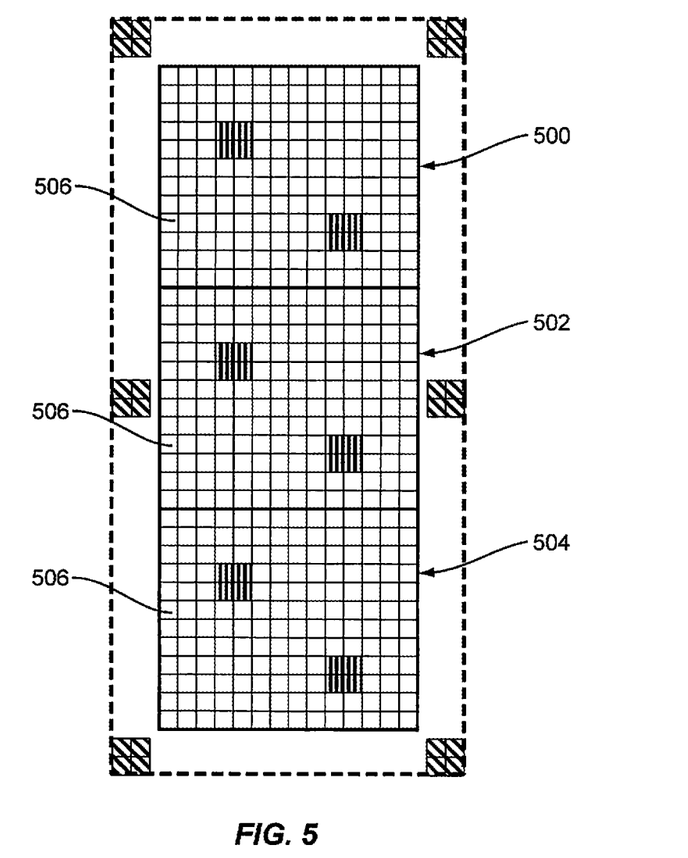
FIG. 5 illustrates a block diagram of another embodiment of an OFDM reference symbol distribution scheme.

FIG. 5 illustrates an embodiment of a series of contiguous OFDM resource blocks 500, 502, 504 allocated to the same communication device 110 where at least some of the reference symbols associated with the resource blocks 502, 504, 506 are transmitted in resource blocks (not shown) allocated to other communication devices 150 as indicated by the resource elements 506 having diagonal stripes. The reference symbols encompass the contiguous series of OFDM resource blocks 502, 504, 506 in the time-frequency domain as indicated by the dashed lines in FIG. 5, enabling the receiving communication device 110 to perform channel estimation using an interpolative technique. The contiguous series of OFDM resource blocks 502, 504, 506 may include reference symbols dedicated to the 110 device for which the blocks 502, 504, 506 are allocated and may also include reference symbols dedicated to other devices 150 as indicated by the resource elements 506 having vertical stripes. Greater data symbol density is achieved because fewer reference symbols are needed to estimate the channel over which the contiguous series of OFDM resource blocks 502, 504, 506 is transmitted.

Figure 6:
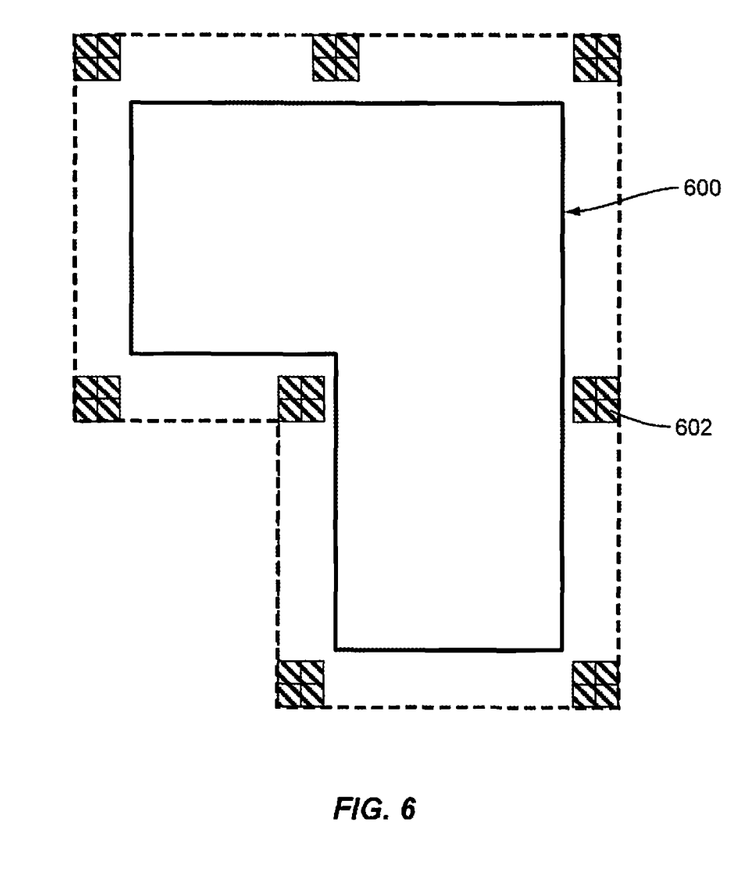
FIG. 6 illustrates a block diagram of an embodiment of a WiMAX reference symbol distribution scheme.

FIG. 6 illustrates an embodiment of a resource block 600 allocated to a communication device 110 where at least some of the reference symbols associated with the resource block 600 are transmitted in resource blocks (not shown) allocated to other communication devices 150 as identified by the resource elements 602 having diagonal stripes. According to this embodiment, the resource block 600 has a non-rectangular polygonal shape. In one embodiment, the reference symbols dedicated to the communication device 110 encompass the resource block 600 as indicated by the dashed lines in FIG. 6. The resource block 600 may include additional reference symbols dedicated to the user 110 of the resource block 600 and/or reference symbols dedicated to other device(s) 150.

Figure 7:
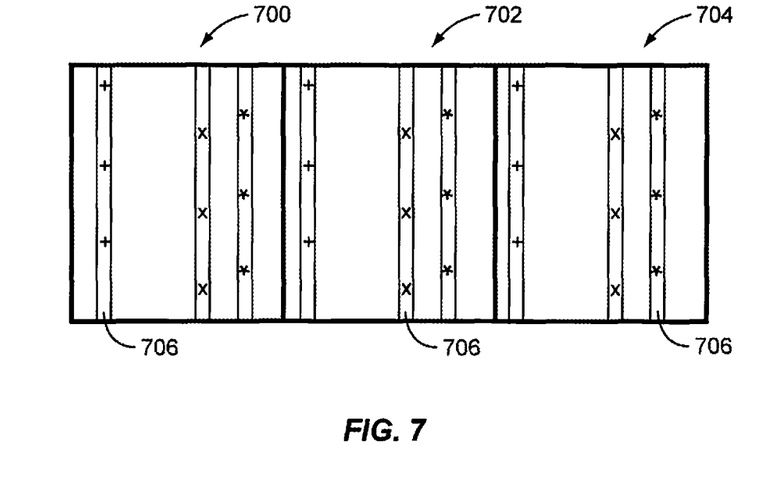
FIG. 7 illustrates a block diagram of an embodiment of a TDMA reference symbol distribution scheme.

FIG. 7 illustrates an embodiment of a series of TDMA resource blocks 700, 702, 704 allocated to different communication devices 110, 150. Each TDMA resource block 700, 702, 704 is divided into time slots 706 in which data symbols and/or reference symbols can be transmitted. The reference symbols dedicated to the user associated with the first resource block 700 are indicated by the '+' symbols in FIG. 7. The reference symbols dedicated to the user associated with the second resource block 702 are indicated by the 'x' symbols in FIG. 7. The reference symbols dedicated to the user associated with the third resource block 704 are indicated by the '*' symbols in FIG. 7. At least some of the reference symbols dedicated to each user are transmitted in a time slot 706 of the resource block allocated to that user. The remaining reference symbols dedicated to each user are transmitted in resource block(s) allocated to other user(s). Accordingly, one or more time slots 706 of each TDMA resource block 700, 702, 704 has reference symbols dedicated to the user 110 of the block and other time slot(s) 706 of each resource block 700, 702, 704 include reference symbols dedicated to other devices 150.

The base station 120 makes each communication device 110, 150 aware of how to receive and process reference symbols dedicated to the device 110, 150 that are transmitted in resource blocks allocated to other devices. In one embodiment, the desired reference symbol distribution scheme is predetermined and programmed into the base station 120 and the communication devices 110, 150 and automatically used each time communication occurs between the base station 120 and the devices 110, 150. Alternatively, the base station 120 indicates to the communication devices 110, 150 how each device should receive reference symbols transmitted in resource blocks allocated to other devices. This embodiment provides flexibility, but consumes additional bandwidth. According to one embodiment, the base station 120 transmits an index value to the communication devices 110, 150 that corresponds to a predetermined transmission scheme used to transmit reference symbols. Each communication device 110, 150 uses the index value to identify the corresponding reference symbol transmission scheme, e.g. by using the index value as a search parameter in a lookup table. In yet another embodiment, the base station 120 signals the reference symbol transmission scheme to the communication devices 110, 150, e.g. over a control signaling channel. This embodiment provides more flexibility, but consumes even greater bandwidth. In each embodiment, a communication device 110 receives and processes reference symbols dedicated to the device 110 that are transmitted in resource blocks allocated to other devices 150 based on the reference symbol distribution scheme employed at the base station 120.

Figure 8:
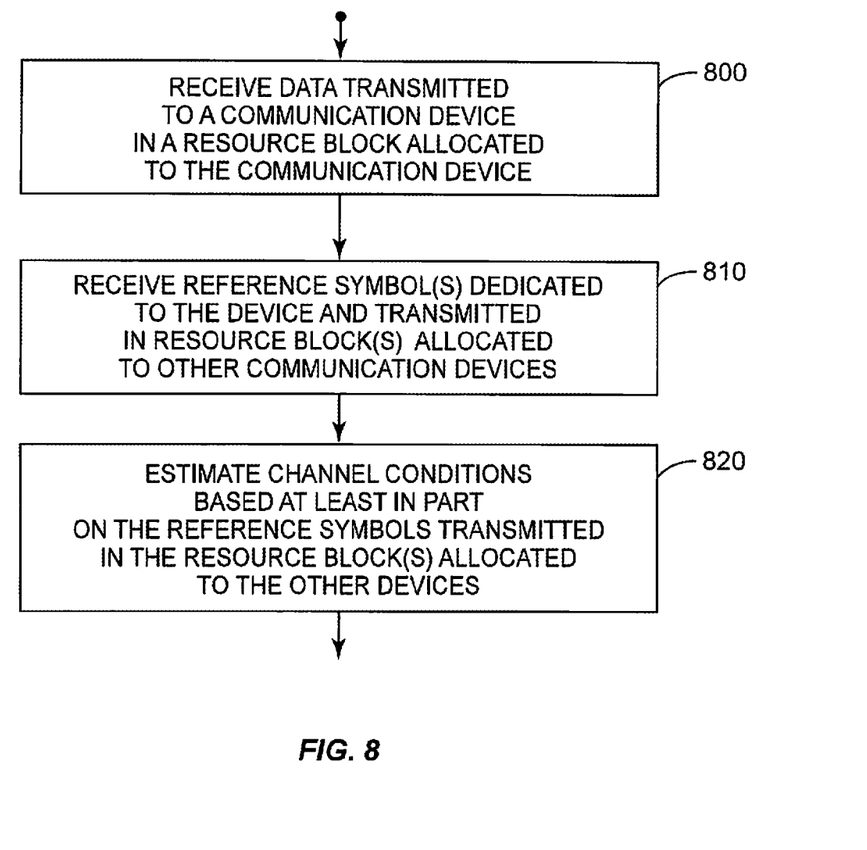
FIG. 8 illustrates an embodiment of a method for estimating channel conditions based on dedicated reference symbols.

In more detail, the receive circuitry 112 of the communication device 110 receives data symbols transmitted to the device 110 in a resource block(s) allocated to the device 110, e.g., as illustrated by Step 800 of FIG. 8. The device receive circuitry 112 also receives one or more reference symbols dedicated to the device 110 and transmitted in resource block(s) allocated to other device(s) 150, e.g., as illustrated by Step 810 of FIG. 8. The communication device baseband processor 114 processes the received data symbols. The device baseband processor 114 also estimates channel conditions based at least in part on the dedicated reference symbol(s) transmitted in resource block(s) allocated to other communication device(s) 150, e.g. as illustrated by Step 820 of FIG. 8. The device baseband processor 114 may employ any known channel estimation technique that utilizes reference symbols.

According to an embodiment, the communication device baseband processor 114 computes channel estimates based at least in part on a plurality of OFDM reference symbols dedicated to the communication device 110 and transmitted in a plurality of resource blocks allocated to other communication devices 150. The OFDM reference symbols encompass the resource block allocated to the communication device 110 in the time-frequency domain, e.g. as shown in FIG. 3. Some of the data symbols dedicated to the communication device 110 may also be transmitted outside the resource block. In one embodiment, the communication device baseband processor 114 processes OFDM data symbols dedicated to the device 110 and transmitted outside the resource block allocated to the device 110, but within the region of the time-frequency domain encompassed by the OFDM reference symbols, e.g. as indicated by the dashed lines in FIG. 3. The communication device baseband processor 114 can also process a contiguous sequence of resource blocks allocated to the device 110, e.g. as illustrated in FIG. 5. According to this embodiment, the device baseband processor 114 estimates channel conditions based at least in part on the reference symbols associated with the contiguous sequence of resource blocks dedicated to the communication device 110. The reference symbols are transmitted in resource blocks allocated to other communication devices 150 and encompass the contiguous sequence of resource blocks.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of transmitting data and reference signals, comprising:
   transmitting a resource block allocated to a first communication device, the resource block including a plurality of resource elements, each resource element corresponding to a modulation symbol; and
   transmitting at least one reference symbol associated with the resource block and dedicated to the first communication device in a resource block allocated to a second communication device.

2. The method of claim 1, comprising transmitting a plurality of reference symbols dedicated to the first communication device in a plurality of resource blocks allocated to other communication devices so that the reference symbols encompass the resource block allocated to the first communication device in the time-frequency domain.

3. The method of claim 2, comprising transmitting data symbols dedicated to the first communication device outside the resource block allocated to the first communication device, but within the region of the time-frequency domain encompassed by the reference symbols.

4. The method of claim 1, comprising transmitting, by a base station, a data symbol dedicated to the first communication device in a resource block associated with the base station and allocated to a different communication device.

5. The method of claim 1, further comprising the step of indicating to the first communication device where to receive the at least one reference symbol.

6. The method of claim 5, comprising transmitting an index value to the first communication device corresponding to a predetermined transmission scheme used to transmit the at least one reference symbol.

7. The method of claim 1, comprising:
   transmitting a contiguous sequence of resource blocks allocated to the first communication device; and
   transmitting a plurality of reference symbols associated with the contiguous sequence of resource blocks and dedicated to the first communication device, at least some of the plurality of reference symbols being transmitted in resource blocks allocated to other communication devices so that the reference symbols encompass the contiguous sequence of resource blocks.

8. A communication device, comprising:
   a baseband processor configured to allocate a resource block to a first communication device and dedicate a plurality of reference symbols associated with the resource block to the first communication device, the resource block including a plurality of resource elements, each resource element corresponding to a modulation symbol; and
   a transmitter configured to transmit the resource block to the first communication device and transmit at least one of the reference symbols dedicated to the first communication device in a resource block allocated to a second communication device.

9. The communication device of claim 8, wherein the transmitter is configured to transmit at least some of the reference symbols in resource blocks allocated to other communication devices so that the reference symbols encompass the resource block allocated to the first communication device in the time-frequency domain.

10. The communication device of claim 9, wherein the transmitter is configured to transmit a plurality of data symbols dedicated to the first communication device outside the resource block allocated to the first communication device, but within the region of the time-frequency domain encompassed by the reference symbols.

11. The communication device of claim 8, wherein the transmitter is configured to transmit a data symbol dedicated to the first communication device in a resource block associated with the communication device and allocated to a different communication device.

12. The communication device of claim 8, wherein the baseband processor is configured to indicate to the first communication device where to receive the at least one reference symbol transmitted in the resource block allocated to the second communication device.

13. The communication device of claim 12, wherein the baseband processor is configured to indicate an index value to the first communication device corresponding to a predetermined transmission scheme used to transmit the at least one of reference symbol in the resource block allocated to the second communication device.

14. The communication device of claim 8, wherein the transmitter is configured to transmit a contiguous sequence of resource blocks allocated to the first communication device and transmit at least some of the reference symbols dedicated to the first communication device in resource blocks allocated to other communication devices so that the reference symbols encompass the contiguous sequence of resource blocks.

15. A method of estimating channel conditions, comprising:
processing data transmitted to a first communication device in a resource block allocated to the first communication device, the resource block having a plurality of resource elements, each resource element corresponding to a modulation symbol; and
estimating channel conditions by the first communication device based on a plurality of reference symbols associated with the resource block and dedicated to the first communication device, wherein at least one of the reference symbols is received in a resource block allocated to a second communication device.

16. The method of claim 15, wherein at least some of the reference symbols are received in a plurality of resource blocks allocated to other communication devices, the reference symbols encompassing the resource block allocated to the first communication device in the time-frequency domain.

17. The method of claim 16, comprising processing data symbols dedicated to the first communication device and received outside the resource block allocated to the first communication device, but within the region of the time-frequency domain encompassed by the reference symbols.

18. The method of claim 15, comprising:
receiving an index value corresponding to a predetermined transmission scheme used to transmit the at least one reference symbol in the resource block allocated to the second communication device; and
receiving the at least one reference symbol based on the predetermined transmission scheme.

19. The method of claim 15, comprising:
receiving a contiguous sequence of resource blocks allocated to the first communication device, the reference symbols being associated with the contiguous sequence of resource blocks; and
estimating channel conditions by the first communication device based on the reference symbols, wherein at least some of the reference symbols are received in resource blocks allocated to other communication devices and encompass the contiguous sequence of resource blocks.

20. A communication device, comprising a baseband processor configured to:
process data transmitted to the communication device in a resource block allocated to the communication device, the resource block having a plurality of resource elements, each resource element corresponding to a modulation symbol; and
estimate channel conditions based on a plurality of reference symbols associated with the resource block and dedicated to the communication device, wherein at least one of the reference symbols is received in a resource block allocated to a different communication device.

21. The communication device of claim 20, wherein at least some of the reference symbols are received in a plurality of resource blocks allocated to other communication devices and encompass the resource block allocated to the communication device in the time-frequency domain and the baseband processor is configured to estimate the channel conditions based on the reference symbols.

22. The communication device of claim 21, wherein the baseband processor is configured to process data symbols dedicated to the communication device and received outside the resource block allocated to the communication device, but within the region of the time-frequency domain encompassed by the reference symbols.

23. The communication device of claim 20, wherein the baseband processor is configured to receive an index value corresponding to a predetermined transmission scheme used to transmit the at least one reference symbol in the resource block allocated to the different communication device and receive the at least one reference symbol based on the predetermined transmission scheme.

24. The communication device of claim 20, wherein the baseband processor is configured to process a contiguous sequence of resource blocks allocated to the communication device, the reference symbols are associated with the contiguous sequence of resource blocks, the baseband processor is configured to estimate the channel conditions based on the reference symbols, at least some of the reference symbols are received in resource blocks allocated to other communication devices and the reference symbols encompass the contiguous sequence of resource blocks.

* * * * *